United States Patent
Choo et al.

(10) Patent No.: US 10,090,546 B2
(45) Date of Patent: Oct. 2, 2018

(54) METHOD FOR ACTIVATING FUEL CELL STACK WITHOUT USING ELECTRIC LOAD

(71) Applicant: HYUNDAI MOTOR COMPANY, Seoul (KR)

(72) Inventors: Hyun Suk Choo, Yongin-Si (KR); Sung Keun Lee, Suwon-si (KR); Dae Keun Chun, Seoul (KR); Hwan Soo Shin, Uiwang-si (KR); Jae Hyuk Lee, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 216 days.

(21) Appl. No.: 14/863,367

(22) Filed: Sep. 23, 2015

(65) Prior Publication Data

US 2016/0164132 A1 Jun. 9, 2016

(30) Foreign Application Priority Data

Dec. 3, 2014 (KR) .................. 10-2014-0172412

(51) Int. Cl.
*H01M 8/04* (2016.01)
*H01M 8/10* (2016.01)
*H01M 8/24* (2016.01)
*H01M 8/04828* (2016.01)
*H01M 8/04223* (2016.01)
(Continued)

(52) U.S. Cl.
CPC ......... *H01M 8/0485* (2013.01); *H01M 8/043* (2016.02); *H01M 8/04223* (2013.01); *H01M 8/04753* (2013.01); *H01M 8/04783* (2013.01); *H01M 2008/1095* (2013.01); *H01M 2250/20* (2013.01); *Y02P 70/56* (2015.11); *Y02T 90/32* (2013.01)

(58) Field of Classification Search
CPC .... H01M 8/0485; H01M 8/2465; H01M 8/10; H01M 8/04223; H01M 8/043; H01M 8/04753; H01M 8/04783
See application file for complete search history.

(56) References Cited

U.S. PATENT DOCUMENTS

2003/0180586 A1* 9/2003 Hagans .............. H01M 8/04119
429/429
2006/0046106 A1* 3/2006 Yu ..................... H01M 8/04231
429/414
(Continued)

FOREIGN PATENT DOCUMENTS

KR 10-2009-0119069 A 11/2009
KR 10-2012-0059802 A 6/2012
(Continued)

*Primary Examiner* — Maria Laios
*Assistant Examiner* — Angela Martin
(74) *Attorney, Agent, or Firm* — McDermott Will & Emery LLP

(57) ABSTRACT

A method for activating a fuel cell stack without using an electric load includes chemically adsorbing hydrogen into a catalyst of a cathode. Oxygen remaining in the stack is removed to seal and store the fuel cell stack while maintaining a negative pressure in the fuel cell stack. The method for activating a fuel cell stack does not require an electric load device, and therefore does not increase the number of activation equipment, thereby preventing the total production speed of the fuel cell stack from reducing in response to the stack activation.

8 Claims, 3 Drawing Sheets

(51) Int. Cl.
H01M 8/04746 (2016.01)
H01M 8/043 (2016.01)
H01M 8/1018 (2016.01)

(56) References Cited

U.S. PATENT DOCUMENTS

| | | | | |
|---|---|---|---|---|
| 2007/0003805 A1* | 1/2007 | Sugawara | ......... | H01M 8/04231 |
| | | | | 429/423 |
| 2007/0099040 A1* | 5/2007 | Morita | .............. | H01M 8/04231 |
| | | | | 429/429 |
| 2008/0245588 A1* | 10/2008 | Wake | ................ | H01M 8/04179 |
| | | | | 180/65.31 |
| 2014/0045086 A1 | 2/2014 | Choo et al. | | |
| 2015/0180064 A1* | 6/2015 | Chun | ................ | H01M 8/04231 |
| | | | | 429/416 |

FOREIGN PATENT DOCUMENTS

| | | |
|---|---|---|
| KR | 10-2012-0092215 A | 8/2012 |
| KR | 10-2013-0010414 A | 1/2013 |
| KR | 10-1326484 B1 | 11/2013 |
| KR | 10-2014-0076255 A | 6/2014 |

\* cited by examiner

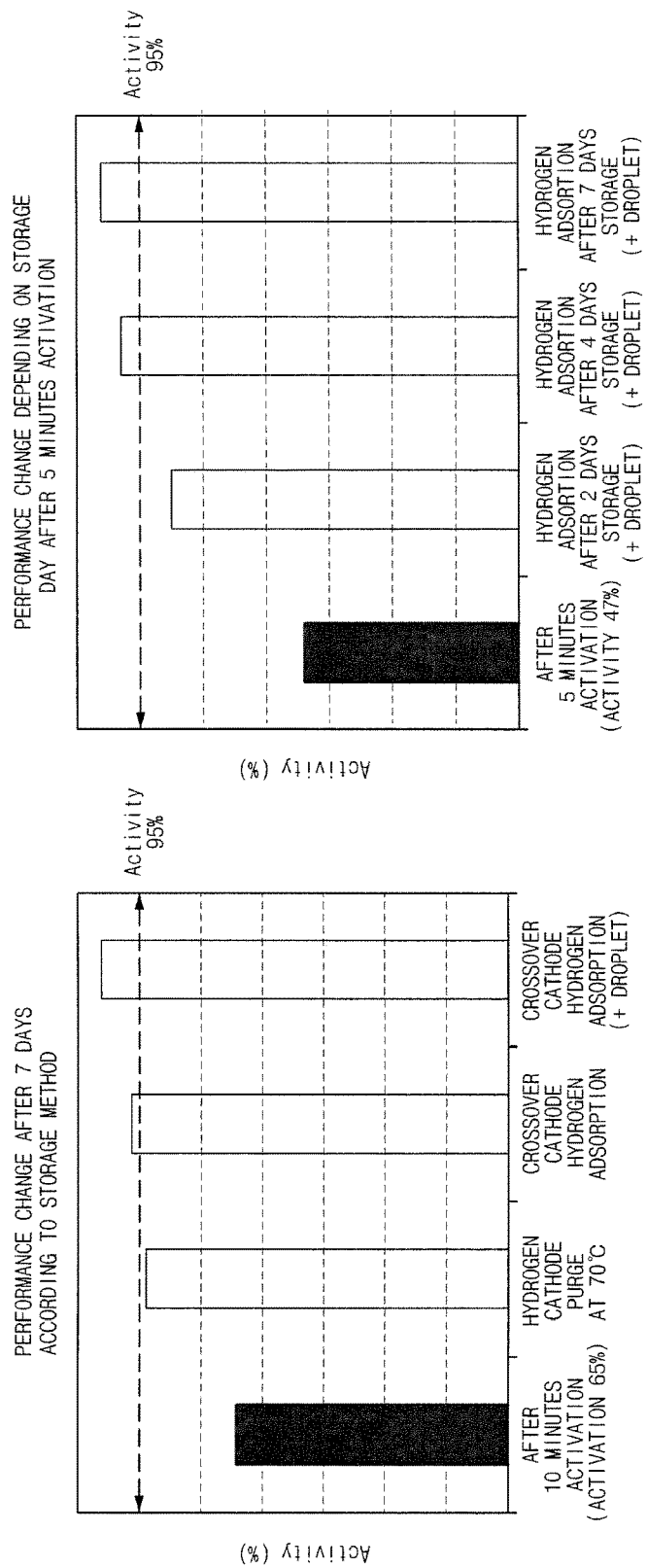

METHOD FOR ACTIVATING FUEL CELL STACK WITHOUT USING ELECTRIC LOAD

CROSS-REFERENCE TO RELATED APPLICATION

This application is based on and claims the benefit of priority to Korean Patent Application No. 10-2014-0172412, filed on Dec. 3, 2014 in the Korean Intellectual Property Office, the disclosure of which is incorporated herein in its entirety by reference.

TECHNICAL FIELD

The present disclosure relates to a method for activating a fuel cell stack capable of carrying out stack activation in a state in which the fuel cell stack is sealed and stored, and more particularly, to a method for activating a fuel cell stack capable of activating a fuel cell stack only by storing the fuel cell stack without using an electric load.

BACKGROUND

Due to worldwide attention to environment pollution and regulations of $CO_2$, there is a need to develop eco-friendly vehicles. As a result, there has been a growing interest in a fuel cell vehicle which is eco-friendly and excellent in efficiency in order to replace an internal combustion engine vehicle which causes environmental pollution.

Among fuel cells for a vehicle, a polymer electrolyte membrane fuel cell has been drawn most attention. The polymer electrolyte membrane fuel cell has higher efficiency, current density, output density, and a shorter starting time, and uses a solid electrolyte to prevent corrosion. Further, there is no need to control an electrolyte.

The polymer electrolyte membrane fuel cell generates electrical energy while generating water and heat by an electrochemical reaction of a fuel including hydrogen with an oxidizer such as air, in which a supplied fuel is separated into hydrogen ions and electrons at a catalyst of an anode electrode, and then, the separated hydrogen ions move over a cathode electrode through a polymer electrolyte membrane. In this case, the oxidizer is combined with the electrons which move along an external wire to generate the electrical energy while supplying water.

In the actual fuel cell for a vehicle, an individual unit cell needs to be stacked as much as required potential to obtain high potential.

In general, to operate the fuel cell stacks after assembling the fuel cell stacks which are an essential component of a fuel cell vehicle, a need exists for a process of activating a stack to secure a triple phase boundary (TPB), remove impurities of the polymer electrolyte membrane or the electrode, and improve ion conductivity of the binder and the polymer electrolyte membrane.

In particular, after the fuel cell stacks are assembled, the activity is reduced in the electrochemical reaction at the time of an initial operation. Therefore, a process of activating a fuel cell stack needs to be carried out to secure a normal initial performance of the fuel cell stack.

The process of activating a fuel cell stack is called pre-conditioning or break-in. Here, the process of activating a fuel cell stack is to activate a catalyst which does not participate in the reaction and sufficiently hydrate the electrolyte included in the electrolyte membrane and the electrode to secure a hydrogen ion passage.

Generally, to activate the fuel cell electrode membrane, various activation protocols such as constant potential, constant current, and a pulse current under high humidity conditions have been developed. A recent method for activating a fuel cell stack which has been mainly used is a method of repeatedly performing a process of discharging high current density (1.2 or 1.4 $A/cm^2$) for 30 seconds and a process of performing a pulse discharge for 2 to 3 minutes in a shut-down condition. However, the activation method based on a pulse needs to use an electric load to apply a high current load and greatly increases a consumed quantity of hydrogen.

In the activation process as described above, a usage time of the activation equipment (including the electric load) is equal to or more than about 90 minutes, and the consumed quantity of hydrogen is equal to or more than 1.7 kg based on a sub-module. However, if the production of the fuel cell stack increases in future, the stack activation may be a bottle neck making the total production speed of the fuel cell stack slow due to the limitation of the stack activation equipment.

Further, a method for achieving partial activation by directly supplying hydrogen and a droplet into the cathode of the stack and a method for additionally achieving complete activation by partial activation using an electric load and storage have also been used. These methods need to use the electric load in the partial activation process or the additional activation process. The hydrogen adsorption method directly supplies hydrogen and a droplet from the outside into the cathode, and therefore, the hydrogen adsorption method has a disadvantage in that there is a need to change a pipe and the hydrogen is not adsorbed onto a surface of platinum of the cathode adjacent to the membrane well.

SUMMARY

The present disclosure has been made to solve the above-mentioned problems occurring in the prior art while advantages achieved by the prior art are maintained intact.

An aspect of the present inventive concept provides a method for activating a fuel cell stack without using an electric load capable of shortening a required time for activation and a consumed quantity of hydrogen and removing the need for change in a pipe even in a hydrogen adsorption method.

According to an exemplary embodiment of the present inventive concept, a method for activating a fuel cell stack includes: chemically adsorbing hydrogen into a catalyst of a cathode; and removing oxygen remaining in the fuel cell stack to seal and store the fuel cell stack while maintaining a negative pressure in the fuel cell stack.

In the step of chemically adsorbing the hydrogen, the hydrogen may be directly purged into the cathode or the hydrogen pressed to an anode side may crossover to be chemically adsorbed into the catalyst of the cathode.

A moisture droplet may be impregnated into the cathode and a separator membrane as the negative pressure is maintained in the fuel cell stack, and swelling of the separator membrane may be formed by a pressure difference between the separator membrane and an electrode while maintaining the negative pressure.

The droplet may mean condensed water from humidified gas or reaction generated water due to crossed over hydrogen and a reaction formula may be $2H_2+O_2 \rightarrow 2H_2O$ ($\Delta H = -285$ kJ/mol, 25° C.).

An oxide film of the catalyst of the cathode may be removed under hydrogen reduction atmosphere formed inside the fuel cell stack during sealing and storing the stack, and the oxygen remaining in the cathode may be removed by a resistance connection with the outside of the fuel cell stack during the sealing and storing of the fuel cell stack.

The resistance connection with the outside of the fuel cell stack may be made by connecting an external resistance (w/50-100Ω) in series.

The method may further include preventing external air from being introduced into the fuel cell stack.

The method may further include activating the fuel cell stack using an electric load.

According to another exemplary embodiment of the present inventive concept, a fuel cell stack may be activated by sealing and storing the fuel cell stack for at least three weeks using a method for activating a fuel cell stack. The method may include chemically adsorbing hydrogen into a catalyst of a cathode; and removing oxygen remaining in the fuel cell stack to seal and store the fuel cell stack while maintaining a negative pressure in the fuel cell stack.

According to the present disclosure, the method for activating a fuel cell stack equal to or more than 95% by storing the fuel cell stack after activating the fuel cell stack using an electric load only for about 5 to 10 minutes may more drastically reduce an activation time than the existing method.

Further, the activation of the fuel cell stack may be completed by sealing and storing the fuel cell stack for at least three weeks using the method for activating a fuel cell stack of the present disclosure without using the electric load.

BRIEF DESCRIPTION OF THE DRAWINGS

The above and other objects, features and advantages of the present disclosure will be more apparent from the following detailed description taken in conjunction with the accompanying drawings.

FIGS. 1A and 1B are graphs illustrating a performance change and a performance deviation of a fuel cell which is sealed and stored using a method for activating a fuel cell stack according to an exemplary embodiment of the present inventive concept, in which FIG. 1A illustrates a performance change of a cell depending on a storage day and FIG. 1B illustrates a performance deviation of the cell depending on the storage day.

FIGS. 2A and 2B are graphs illustrating various performances of the fuel cell which is sealed and stored using the method for activating a fuel cell stack according to an exemplary embodiment of the present inventive concept, in which FIG. 2A illustrates an open circuit voltage (OCV) change depending on a storage day and FIG. 2B illustrates a resistance change depending on the storage day.

FIG. 3A is graph illustrating a performance change after 7 days according to each storage method when the fuel cell is sealed and stored using the method for activating a fuel cell stack according to an exemplary embodiment of the present inventive concept, after the fuel cell stack is activated by an electric load device for 10 minutes and FIG. 3B is a graph illustrating a performance change depending on each storage day when the fuel cell is sealed and stored using the method for activating a fuel cell stack according to an exemplary embodiment of the present inventive concept, after the fuel cell stack is activated by the electric load device for 5 minutes.

DETAILED DESCRIPTION

To achieve the above objects, exemplary embodiments of the present inventive concept provide a method for completely activating a fuel cell stack only by sealing and storing the fuel cell stack without using an electric load device and partial activation, by improving the existing apparatus and method for activating a fuel cell stack.

Hereinafter, a method for activating a fuel cell stack corresponding to an exemplary embodiment of the present inventive concept will be described in detail with reference to the accompanying drawings.

Figure 1A:
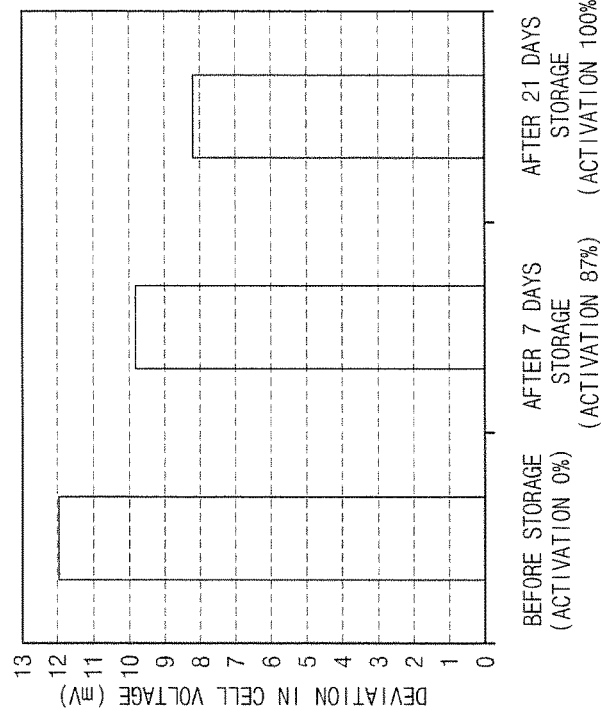
Figure 1B:
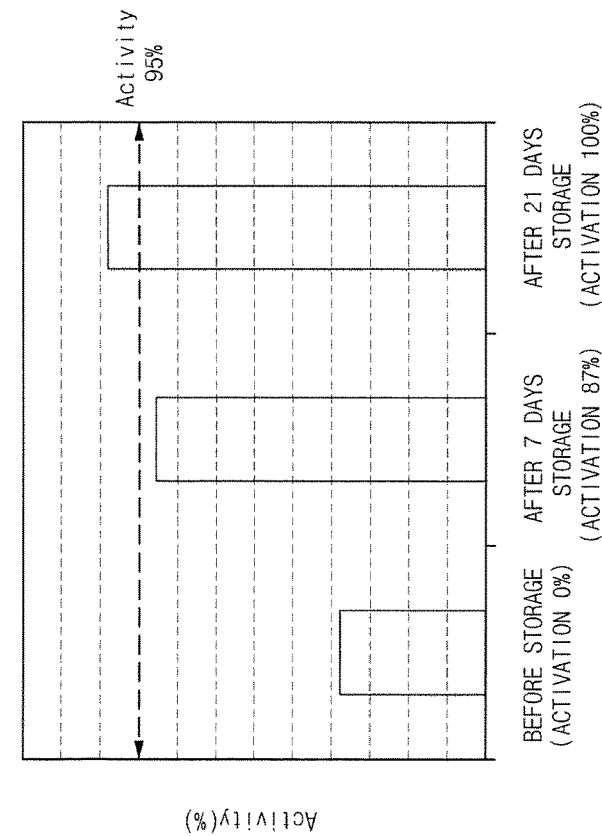
Figure 2B:
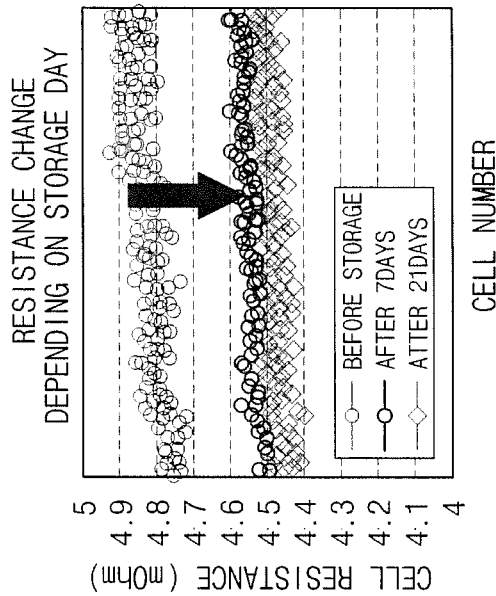

As illustrated in FIG. 1A, it may be appreciated that in a case of using a method for sealing and storing a fuel cell stack according to an exemplary embodiment of the present inventive concept, activation is gradually carried out depending on a storage day, and thus, the complete activation is carried out after 21 days. Although the fuel cell stack is stored only for 7 days, the activation reaches 87%, and as illustrated in FIG. 2B, it may be appreciated that a performance deviation of individual cells depending on the storage day is gradually reduced depending on the storage day.

The method for sealing and storing a fuel cell stack according to the present disclosure includes chemically adsorbing hydrogen into a catalyst of a cathode and removing oxygen remaining in the stack to seal and store the fuel cell stack while keeping a negative pressure in the stack, in which in the chemically adsorbing of the hydrogen into the catalyst of the cathode, the hydrogen is directly purged into the cathode or the pressed hydrogen crosses over to an anode side to be chemically adsorbed into the catalyst of the cathode.

Generally, a crossover method has been mainly used. When the hydrogen is chemically adsorbed into a platinum catalyst of the cathode through the crossover, the hydrogen is swelled into a platinum lattice adjacent to a membrane by the chemical adsorption. In this case, the hydrogen is adsorbed into oxides of the platinum formed before being sealed and stored and water is separated therefrom to reduce the platinum.

In a mechanism of activating a fuel cell stack using the method for sealing and storing a fuel cell stack according to an exemplary embodiment of the present inventive concept, an oxide film of the platinum catalyst is removed by hydrogen reduction atmosphere formed in the stack and a binder $SO_3$ of a platinum catalyst interface is rearranged to improve an exchange current density of the platinum catalyst of the cathode. Further, ion conductivity is reduced by membrane swelling based on separator membrane hydration of a droplet by forming the negative pressure in the stack, thereby helping the activation.

Figure 2A:
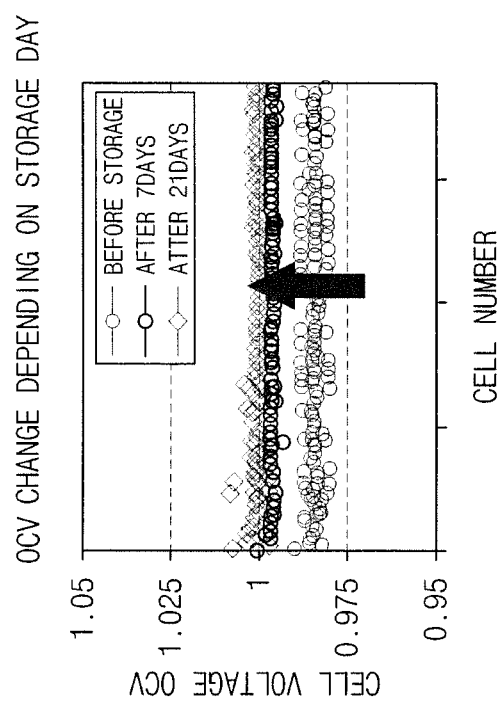

The method for sealing and storing a fuel cell stack according to the present disclosure increases an open circuit voltage (OCV) of a fuel cell and reduces the resistance of the cell. According to characteristics of the fuel cell depending on the storage day of FIGS. 2A and 2B, it may be confirmed how much the performance of the cell increases at three timings such as before the storage, after 7 days, and after 21 days, respectively.

The method for sealing and storing a fuel cell stack according to the present disclosure completely activates the fuel cell stack only in about 21 days only by sealing and storing the fuel cell stack without partial activation. In a case of mass producing the fuel cell stack in future, the stack which is partially activated using an electric load only for 5 minutes or 10 minutes may be additionally activated by the method for sealing and storing a fuel cell stack according to the present disclosure. The currently used method for activating a fuel cell stack performs the activation more than 95% (0.610V or more on average per a current density of 1 $A/cm^2$) and uses the electric load for about 80 minutes. The activation more than 95% may be achieved by using the method for sealing and storing a fuel cell stack according to the present disclosure using the fuel cell stack in the case of using the electric load (activity 47%) for 5 minutes or the electric load for 10 minutes (activity 65%).

In this case, it may be appreciated that in the case in which the hydrogen is adsorbed into platinum of the cathode under the condition that the droplet is present, the storage activity progress is the highest. Referring to a graph of 'performance change after 7 days depending on the storage method' of FIG. 3A, it can be appreciated that when the fuel cell stack is stored for 7 days after being activated for 10 minutes (activity 65%) by the electric load, as the method for adsorbing the hydrogen into the platinum of the cathode, a cathode hydrogen adsorption method using an anode crossover has activity higher than that of a 70° C. hydrogen cathode purge method and the cathode hydrogen adsorption method using the anode crossover under the condition that the droplet is present has the highest activity.

Further, referring to the graph of 'performance change depending on storage day after the activation for 5 minutes' of FIG. 3B, it may be appreciated that the activity more than 95% may be achieved only in 4 days when adsorbing the hydrogen into the platinum of the cathode under a condition that the droplet is present after the activation for 5 minutes (activity 47%). It is considered that the method is very useful for mass production of the fuel cell stack in future.

Further, the method used in the hydrogen adsorption process by activating a fuel cell stack according to the present disclosure uses a method of directly purging hydrogen to a catalyst of a cathode or a method of chemically adsorbing into the catalyst of the cathode by crossing over the hydrogen pressed to the anode side. In the method of injecting hydrogen through the crossover, the hydrogen supplied to the anode is swelled into the cathode through the crossover of the membrane and the hydrogen physically adsorbed into the surface of the platinum of the cathode is chemically adsorbed to be swelled into the platinum lattice adjacent to the membrane. In the direct purge method, the hydrogen chemically adsorbed into the surface of the platinum of the cathode during the storage is activated relatively slower and thus oxides (Pt—OH, Pt—O, Pt—$O_2$) of the surface of the platinum which is not yet reduced as a target may be efficiently activated.

Further, when removing the oxygen remaining in the stack during the sealing and storing of the fuel cell stack in the method for activating a fuel cell stack according to the present disclosure, the negative pressure is induced, and thus, the droplet inside the stack may be easily impregnated into the membrane and the binder. Here, the droplet is swelled into pores inside the membrane and thus a surface structure of the inside of the membrane suitable for a cation movement is formed. Further, when removing the oxygen remaining in the cathode by the resistance connection with the outside of the stack during the storing the fuel cell, an external resistance (w/50-100Ω) is connected in series during the sealing and storing of the fuel cell stack to continuously remove the oxygen which may be introduced during the storage.

Reviewing the problem occurring when the oxygen remaining in the cathode is not removed, when the hydrogen is stored and adsorbed into the cathode, a reduction reaction of the oxides of the surface of the platinum is formed under the hydrogen reduction atmosphere and the $SO_3^-$ which is adsorbed during the manufacturing of the electrode membrane is easily desorbed. In this case, when some of the hydrogen remains in the cathode, an electrochemical mixed potential of the hydrogen and the oxygen is formed at the cathode side during the storage and thus the reaction speed to activate the catalyst at the cathode side is slow. Therefore, maximally removing the oxygen remaining in the cathode side before the sealing and storing of the stack or during the sealing and storing of the stack is considered as an important factor to complete the activation without the partial activation using the electric load.

By the above means for solving the problem, the present disclosure has the following effects.

As described above, the method for activating a fuel cell stack according to the present disclosure does not require electric load devices, and therefore does not increase the number of activation equipment in response to the increase in the production of the stack in future, thereby preventing the total production speed of the fuel cell stack from reducing in response to the stack activation. Further, it is possible to greatly reduce the consumed quantity of hydrogen for the stack activation.

Although the exemplary embodiments of the present inventive concept have been disclosed for illustrative purposes, those skilled in the art will appreciate that the present disclosure is not limited to specific embodiments and various modifications, additions, and substitutions are possible, without departing from the scope and spirit of the disclosure as disclosed in the accompanying claims. Accordingly, such modifications, additions, and substitutions should also be understood to fall within the scope of the present disclosure.

What is claimed is:

1. A method for activating a fuel cell stack, the method comprising:
    chemically adsorbing hydrogen into a catalyst of a cathode; and
    removing oxygen remaining in the fuel cell stack to seal and store the fuel cell stack while maintaining a negative pressure in the fuel cell stack,
    wherein in the step of chemically adsorbing the hydrogen, the hydrogen, which is pressurized toward an anode side, is swelled into the cathode through crossover of a membrane to be chemically adsorbed into the catalyst of the cathode, and
    wherein the oxygen remaining in the cathode is removed by a resistance connection with the outside of the fuel cell stack while the fuel cell stack is sealed and stored.

2. The method according to claim 1, wherein a droplet is impregnated into the cathode and a separator membrane while the negative pressure is maintained in the stack.

3. The method according to claim 2, wherein the droplet is condensed water from humidified gas or reaction generated water.

4. The method according to claim 1, wherein the separator membrane is swollen by a pressure difference between the separator membrane and an electrode while maintaining the negative pressure.

5. The method according to claim 1, wherein an oxide film of the catalyst of the cathode is removed under hydrogen reduction atmosphere formed inside the fuel cell stack while the stack is sealed and stored.

6. The method according to claim 1, wherein the resistance connection with the outside of the fuel cell stack is made by connecting an external resistance (w/50-100Ω) in series.

7. The method according to claim 1, further comprising:
    preventing external air from being introduced into the fuel cell stack.

8. A fuel cell stack which is activated by sealing and storing the fuel cell stack for at least three weeks using a method for activating a fuel cell stack, wherein the method comprises: chemically adsorbing hydrogen into a catalyst of a cathode; and removing oxygen remaining in the fuel cell stack to seal and store the fuel cell stack while maintaining a negative pressure in the fuel cell stack, wherein in the step of chemically adsorbing the hydrogen, the hydrogen, which is pressurized toward an anode side, is swelled into the cathode through crossover of a membrane to be chemically adsorbed into the catalyst of the cathode, and wherein the oxygen remaining in the cathode is removed by a resistance connection with the outside of the fuel cell stack while the fuel cell stack is sealed and stored.

\* \* \* \* \*